United States Patent [19]

De Hoog

[11] Patent Number: 5,917,178
[45] Date of Patent: Jun. 29, 1999

[54] IDENTIFIER TOKEN WITH ELECTRONIC CIRCUITRY AND CONDUCTOR MEANS IN THE TOKEN EXTERNAL TO THE CIRCUITRY FOR REALIZING AN IDENTIFIER CODE

[75] Inventor: Johannes H. De Hoog, Eindhoven, Netherlands

[73] Assignee: U.S. Philips Corporation, New York, N.Y.

[21] Appl. No.: 08/734,004

[22] Filed: Oct. 18, 1996

[30] Foreign Application Priority Data

Oct. 19, 1995 [EP] European Pat. Off. .............. 95202828

[51] Int. Cl.[6] ...................................................... G06K 19/00
[52] U.S. Cl. ............................................ 235/492; 235/380
[58] Field of Search ..................................... 235/380, 382, 235/382.5, 492

[56] References Cited

U.S. PATENT DOCUMENTS

| | | | |
|---|---|---|---|
| 4,074,189 | 2/1978 | Harms et al. ............................. | 324/73 |
| 4,256,955 | 3/1981 | Giraud et al. ........................... | 235/380 |
| 5,557,096 | 9/1996 | Watanabe et al. ...................... | 235/380 |
| 5,603,108 | 2/1997 | Thoone ................................ | 435/186.1 |
| 5,703,795 | 12/1997 | Mankovitz .............................. | 345/327 |

OTHER PUBLICATIONS

Single–Chip 8–Bit Microcontrollers, Chapter 3, The MAB 8051C51 Microcontroller Family, pp. 65–109, Philips Export BV, Eindhoven, NL.

*Primary Examiner*—Donald Hajec
*Assistant Examiner*—Drew A. Dunn
*Attorney, Agent, or Firm*—Peter Verdonk

[57] ABSTRACT

An identifier token has an electronic circuit with a bidirectional electronic interface for accessing the circuit. The circuit comprises an identifier code. The code is realized by bonding the circuit to a conductor external to the circuit as part of a non-volatile coding mechanism. The code may be stored in an on-board EEPROM that is fixated by bonding its write enable pin to an appropriate voltage. A second realization is by means of selective coding interconnections between a series of bond pads and a conductor for forming a string of code elements.

7 Claims, 1 Drawing Sheet

ID ENTIFIER TOKEN WITH ELECTRONIC
CIRCUITRY AND CONDUCTOR MEANS IN
THE TOKEN EXTERNAL TO THE
CIRCUITRY FOR REALIZING AN
IDENTIFIER CODE

BACKGROUND TO THE INVENTION

The invention relates to an identifier token comprising a token body, electronic circuitry embedded in said body, access means for bidirectionally and electronically accessing said circuitry on an external interface, and said circuitry encompassing identifier code means. Such identifier tokens have been realized for various purposes, such as for banking and other financial services, access control to physical spaces, conditional logical access to information services, and as an identifier key to apparatus such as motor cars and computer terminals. The identifier code has been realized in various ways as well, in particular by means of storing such codes in an internal memory that is only internally accessible for confronting with an externally presented password that in some way is transmitted to the token. An example of such token has been disclosed in U.S. Pat. No. 4,256,955 to Giraud.

The storing of a unique code into an integrated circuit means requires that the circuit, at least up to a certain instant, must have a memory write facility. This necessitates particular circuit features. Secondly, a tight security organization is required for keeping the actual code secret, because the time interval between writing the code in a hitech manufacturing environment and the ultimate delivery to a customer can be great. On the other hand, the security that is used expressed as the number of possible different codes or coding space is extremely variable, from many millions in finance, to a few hundred for lowsecurity applications. The cost of coding and code protecting must be commensurate to the financial advantages of the individualization of the tokens.

SUMMARY OF THE INVENTION

In consequence, amongst other things it is an object of the present invention to provide a coding system that needs be implemented only shortly before delivery of the token, and also allows an inexpensive manner to arrive at an intermediate level of security, whilst the code, once provided, should have a good anti-tampering resistance. Now, according to one of its aspects the invention is characterized in that said identifier code means comprise bond means from an integrated circuit in said circuitry interconnected to conductor means external to said circuitry in said body, as part of a non-volatile coding mechanism. Bonding is relatively low-tech and can be provided at many local sites. The final encapsulation can generally also be realized with simple manufacturing facilities.

Advantageously, the token has an on-board EEPROM for storing the code, whilst fixating the EEPROM contents by means of bonding the write enable pin to an appropriate voltage. The fixation voltage on the write enable pin of the EEPROM prevents the memory from being overwritten if writing power were to be applied.

Advantageously, the circuit has a plurality of bond means and selective coding interconnections between said bond means and said conductor means for realizing a string of code elements. In many cases a code space in the order of sixteen bits has been found amply sufficient. Furthermore, useful standard processor chips often have additional ports that are left over from other usages when the processor chip is encapsulated in an identifier token.

By itself, identifying a circuit by means of conducting interconnections for use in a very different environment has been disclosed in U.S. Pat. No. 4,074,189 to the present assignee. The reference relates to the identifying of printed circuit boards. Therein, the identification is for reasons of specific manufacturing or testing of the boards; the technology used is completely different, and finally, secrecy is not an item.

The present invention is extremely useful in an RDS-TMC (Radio Data System-Traffic Message Channel) environment, wherein coded traffic information is broadcast to motor vehicles, and then reproduced in the form of speech. At least part of the information that is necessary for transforming received codes into understandable sentences is provided in a Smart Card. In particular, this information may relate to the representing in a particular language, or to particular filtering features that are relevant for particular categories of users or vehicles. According to a preferred distribution scheme, the card must be matched to a particular RDS-receiver (Radio Data System-receiver), which feature can be advantageously effected through using the invention. Certain aspects of the TMC-system (Traffic Message Channel) have been described in PCT/IB96/510, corresponding U.S. patent application Ser. No. 08/655,172 (PHN 15.334) incorporated herein by reference to the same assignee as the present application. Further advantageous aspects of the invention are recited in dependent Claims.

BRIEF DESCRIPTION OF THE DRAWING

These and other aspects and advantages of the invention will be-discussed hereinafter in detail with reference of disclosed preferred embodiments, and in particular with reference to appended Figures that show.

DETAILED DISCLOSURE OF PREFERRED EMBODIMENTS

Figure 1:
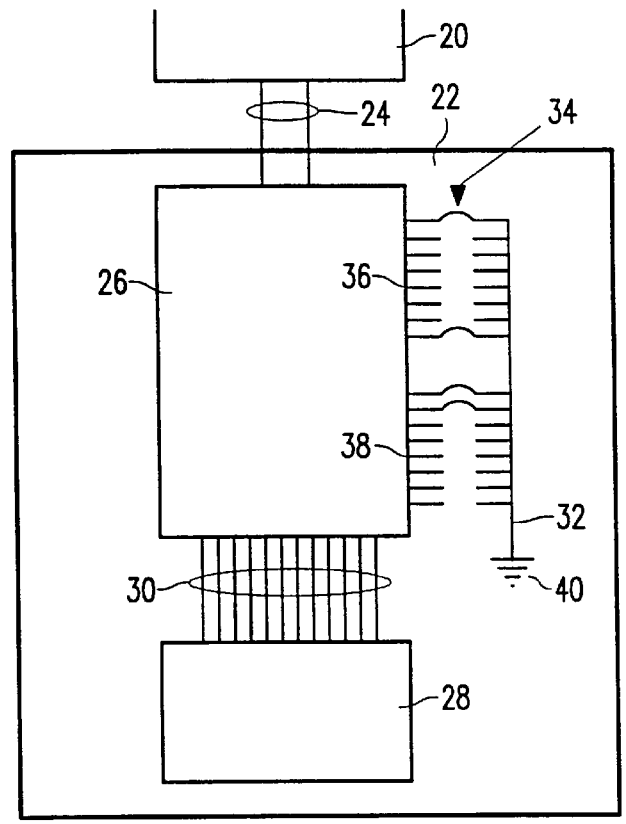
FIG. 1 a general diagram of an identifying token.

FIG. 1 is a general diagram of an identifying token. The token 22 is built from an encapsulating polymer body that can be composed from a central layer for taking up the circuitry in appropriate openings and recesses therein. The central layer is joined to protective outer layers at either side. The recesses may have further polymer bodies inserted therein that are known as stamps. Beforehand, in a separate production run the circuitry proper has been placed into or on the stamp. The main functional circuit is ASIC (Application Specific Integrated Circuit) 26 that may contain a processor with associated registers and logic, local memory, an I/O port, an interface for an external memory, and two further eight-bit ports to be specified hereinafter. The ASIC may in general be configured according to microcontrollers described in the book Single-chip 8-Bit Microcontrollers, Chapter 3, the MAB 8051C51 microcontroller family, p. 65–109, Philips Export BV, Eindhoven, NL. It should be noted that for the present invention, the ASIC may operate as a black box. The I/O port interfaces to a two-wire 12C bus 24. The 12C bus system has been described in U.S. Pat. No. 4,689,740, and furthermore in U.S. Pat. No. 5,559,502, (PHN 14.348) both assigned to the same assignee as the present application. In this example the bus is based on two conductors for connection to external device 20; the bus may also provide for powering the token. Alternative powering methods for the token are by solar cell, on-board battery pack, or wireless external powering through the terminal by means of capacitive or inductive coupling. For simplicity, the constructional details of the token body have been largely ignored.

ASIC 26 by means of wire bundle 30 interfaces to memory 28 that is external to the ASIC, but encapsulated as well in the token body. The interface may have an eight-bit data path, an eight bit address path, and various control connections that for clarity have not been shown in full. Furthermore, ASIC 26 has two 8-bit data ports 36, 38, that interface to external wire 32 connected to ground. This can be realized by connecting to particular metal traces (not shown) that have been provided on the token layer, which traces may also interconnect the two circuits 26, 28. The selective jumpers 34 in this way provide an inherent 16-bit code, inasmuch as they are selectively connected to ground 40 as shown. If unconnected, pulling resistors not shown provide a prespecified voltage on the port pad in question. In another realization, this non-ground voltage may be realized by external connecting. The interconnecting to the pads can be made by conventional bondings. These can be made long after the ASIC circuit proper has been manufactured, and shortly before the actual packaging of the token. In the example shown, ASIC 26 when interrogating the two ports shown, will see a binary code string 1000 0001 1100 0000. Presumably, the high significant side is at the top of the Figure. For many purposes, a sixteen bit code with approximately 32k combinations offers sufficient security. In this context, the RDS-TMC realization is just such an example. Ground connection 40 may be realized by connecting to the terminal, to a grounded housing, or in other conventional manner.

If the code proper is loaded into on-board EEPROM or similar memory, after loading of the memory, the write enable pin or pad thereof is connected to an external voltage for thereupon persistently blocking any further write access to the EEPROM. This connecting is done in the same manner as the connecting of the port pads shown in FIG. 1. The total circuitry of the card may be realized by means of a single integrated circuit.

Figure 2:
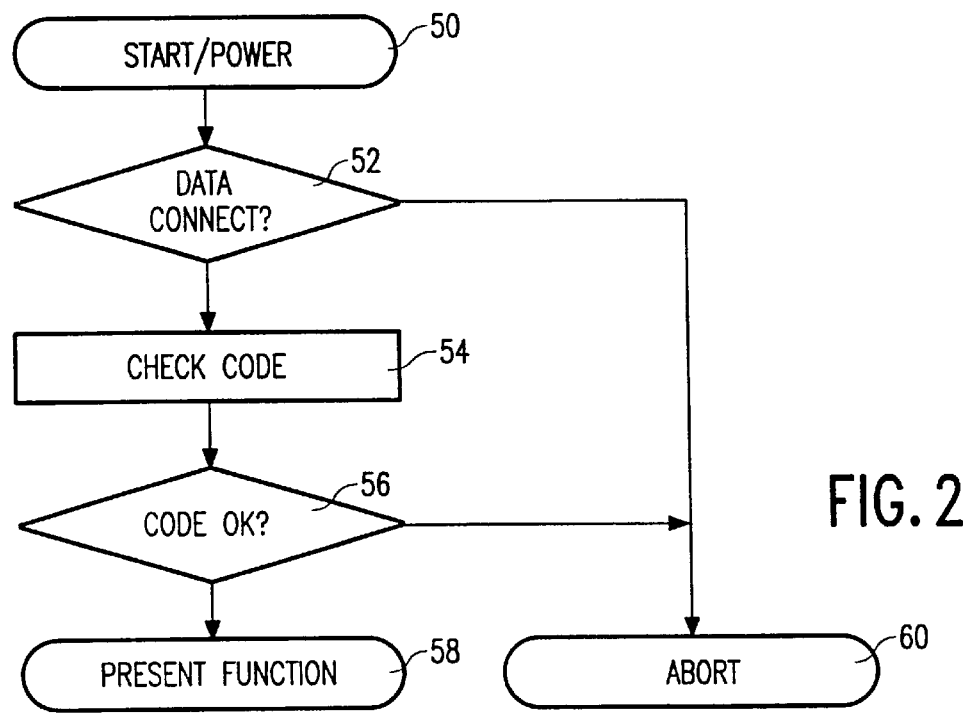
FIG. 2, a flow chart of an identifying procedure.

FIG. 2 is a flow chart of an identifying procedure. In block 50, the token is connected to the terminal, for example, by physical insertion. Subsequently, the token will be provided with adequate electrical power. In block 52, both the token and the terminal check whether adequate data transfer is ensured. This may be done by bidirectional echoing. In block 54, the identifier code is presented to a check mechanism. This can be effected in various ways. A first one is that the token transmits its code to the terminal, either encrypted, or in clear. Another is that the terminal transmits its code for comparison to the identifier code inside the token. Higher-security protocols have been published in abundant manner. If the check is O.K, in block 58 the intended functionality of the combination of terminal and token is presented. Subsequent protocols and operations are outside the scope of the invention. If one of the two tests in blocks 52, 56 fails, the process aborts in block 60.

A particular feature of the token described is the initialization procedure of the terminal; this in effect renders the token multi-application in the context of a car information system. The token is then used with the car radio operating as the terminal device. Upon inserting a particular token into the car radio for the first time, the flow chart 30 of FIG. 2 is executed in a modified manner. Instead of the check in block 56, the process recognizes that no code had up to that instant been loaded into the car radio itself. In that case, the code of the token is copied into the car radio for permanent storage. Subsequently, the same token can function as a source for TMC (Traffic Message Channel) information, and its insertion can also represent a security prerequisite for standard receiver operation of the car radio. Both the loading of the code, and the standard car radio operation the form part of the 'PRESENT FUNCTION' block 58 of FIG. 2.

I claim:

1. An identifier token comprising a token body, electronic circuitry embedded in said body, accesss means for bi-directionally and electronically accessing said circuitry on an external interface, and, said circuitry encompassing identifier code means, wherein said identifier code means comprises bond means from an integrated circuit in said circuitry interconnected to, conductor means external to said circuitry in said body, as part of a non-volatile coding mechanism.

2. A token as claimed in claim 1, and having on-board EEPROM for storing at least part of the identifier code and fixating means for fixating an EEPROM content by means of bonding its write enable pin to an appropriate voltage.

3. A token as claimed in claim 1, having a plurality of bond means and selective coding interconnections between said bond means and said conductor means for realizing a string of code elements.

4. A token as claimed in claim 3, wherein said code elements are binary.

5. A token as claimed in claim 4, wherein said binary elements are realized through selective connections to a powering voltage and to a ground voltage, respectively.

6. A token as claimed in claim 1, and having protocol means for executing a code transfer protocol for confronting a representation of said identifier code to an external code.

7. A token as claimed in claim 6, and having transfer means for upon successful execution of said code transfer and said confronting, transmitting Traffic Message Channel information via said access means.

* * * * *